Patented Apr. 11, 1950

2,503,899

UNITED STATES PATENT OFFICE 2,503,899

DIACRIDYL DIAMINE DERIVATIVES

Edgar C. Britton and Gerald H. Coleman, Midland, Mich., assignors to The Dow Chemical Company, Midland, Mich., a corporation of Delaware No Drawing. Application August 29, 1945,
Serial No. 613,442

3 Claims. (Cl. 260—279)

This invention relates to a group of new diamines containing two acridine nuclei.

The new compounds of the invention correspond to the general formula:

(I)
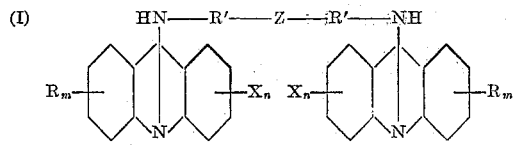

wherein R is lower alkoxy, X is halogen, R' is methylene or p-phenylene, Z is methylene, hydroxymethylene, or oxygen, and m and n each is an integer from 0 to 2. These compounds are all yellowish solids useful in the manufacture of dyestuffs and pharmaceuticals.

Within this group of new compounds, the 6-chloro - 2 - methoxyacridine derivatives corresponding to the general formula:

(II)
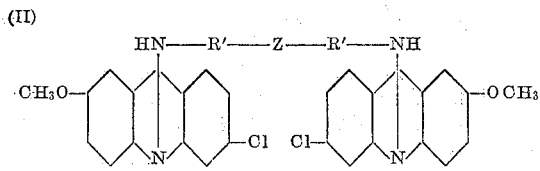

wherein R' is methylene or p-phenylene and Z is methylene, hydroxymethylene, or oxygen, are of greater interest in that they appear to be of value as bactericides.

The new products are in general prepared in good yield by causing a 9-chloroacridine derivative corresponding to the general formula:

(III)
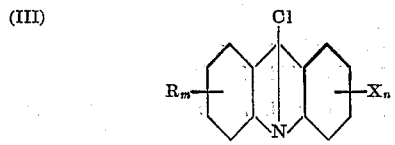
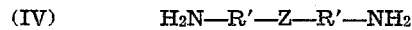

wherein R is lower alkoxy, X is halogen, and m and n each is an integer from 0 to 2, to react with a diamine corresponding to the general formula:

(IV)         H₂N—R'—Z—R'—NH₂ wherein R' is methylene or p-phenylene, and Z is methylene, hydroxymethylene, or oxygen. The reaction is preferably carried out by introducing the reactants in roughly stoichiometric proportions into an excess of a mutual solvent, such as molten phenol, and heating the solution with stirring until reaction is complete, usually in a very few hours. The resulting mixture is then treated with excess aqueous alkali to liberate the desired basic reaction product as a precipitate, which is then removed by filtration, washed with water and preferably also with hot alcohol. The product may be further purified, if desired, by recrystallization from a volatile solvent. Alternatively, the free base may be converted to the hydrochloride by treatment with hydrochloric acid and the hydrochloride purified as desired.

Among the 9-chloroacridine compounds corresponding to the Formula III above which are useful as reactants in making the compounds of the invention are: 9-chloroacridine, 6.9-dichloroacridine, 2.6.9-trichloroacridine, 9-chloro-2 - methoxyacridine, 9-chloro-2-ethoxyacridine, 2-bromo-9-chloro-6-methoxyacridine, 9-chloro-6-iodo - 2 - methoxyacridine, 9 - chloro-3.6-dimethoxyacridine, 9 - chloro - 2.7 - dimethoxyacridine, 6.9-dichloro-2-methoxyacridine, 7.9-dichloro - 2 - methoxyacridine, 6.9-dichloro-2-ethoxyacridine, and .6.9-dichloro-2.3-dimethoxyacridine. All of these reactants, and methods of preparing them, are described in the literature.

The diamines corresponding to the Formula IV above which may be employed in making the compounds of the invention include trimethylene diamine, 1.3-diamino-propanol-2, 4.4'-diamino-diphenylmethane, 4.4'-diamino-benzhydrol, and 4.4'-diamino-diphenylether. Each of these diamines, all of which are known in the art, may be made to react, as described, with any of the foregoing 9-chloroacridine compounds to produce new compounds according to the invention.

An alternative method of making the new compounds consists in causing reaction of a 9-amino-acridine corresponding to the formula (V)
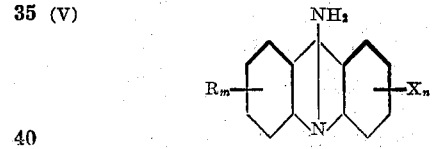

wherein R is lower alkoxy, X is halogen, and m and n each is an integer from 0 to 2, with a dichloro compound corresponding to the formula Cl—R'—Z—R'—Cl wherein R' is methylene or p-phenylene, and Z is methylene, hydroxymethylene, or oxygen. Reaction may be carried out in a solvent by procedures closely similar to those already explained. This second method of preparation is particularly useful in making diacridyl-diamino derivatives of dimethylether, since the diamino-dimethylether required as a reactant by the first method of preparation is not an available material. In making these compounds, sym. dichloro-dimethylether is condensed with 9-aminoacridine compounds of the Formula V to make compounds according to the general Formula I in which R' is methylene and Z is oxygen.

The following examples will further illustrate the invention, but are not to be construed as limiting its scope:

*Example 1*

A solution of 10.5 parts by weight of 6.9-dichloro-2-methoxyacridine in 32 parts of phenol was heated at 60° C. and a solution of 48 parts of 4.4'-diamino-diphenylmethane in 25 parts of phenol was added slowly with agitation, after which the mixture was heated at 100° C. for an hour. The resulting dark red solution was then stirred into 330 parts of 10 per cent aqueous sodium hydroxide, whereupon the free basic reaction product separated as a yellow precipitate. The latter was washed with water until all alkali was removed, filtered off, dried, heated for 0.5 hour with boiling alcohol, again filtered, washed with hot alcohol, and dried in air. There was obtained 9.5 parts of a yellow powder having a melting point of about 214.5° to 215.5° C., and being probably 4.4'-di-(6-chloro-2-methoxy-9-acridylamino)-diphenylmethane.

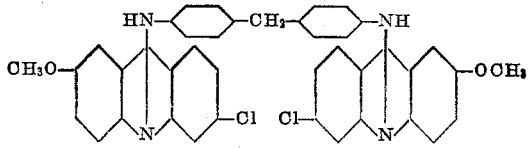

The compound, on analysis, was found to contain 10.23 per cent chlorine, a close approximation to the 10.41 per cent theoretical value for

$C_{41}H_{30}O_2N_4Cl_2$

*Example 2*

A charge of 10.5 parts of 6.9-dichloro-2-methoxyacridine, 1.8 parts of 1.3-diamino-propanol-2, and 52 parts of phenol was heated with agitation at 95° C. for 2 hours. As the reaction proceeded, a greenish-yellow solid gradually formed as a precipitate. The entire mixture was treated with aqueous alkali and the resulting precipitate worked up as in Example 1. There was obtained 10 parts of a greenish-yellow solid which did not melt at temperatures up to 260° C. and was probably 1.3-di-(6-chloro-2-methoxy-9-acridylamino)-propanol-2.

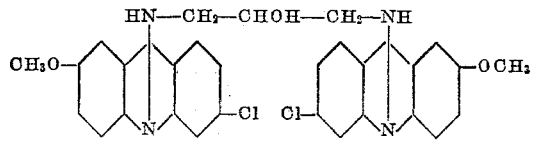

The compound contained 12.0 per cent chlorine, as compared to 12.38 per cent theory for

$C_{31}H_{26}O_3N_4Cl_2$

*Example 3*

A solution of 10.5 parts of 6.9-dichloro-2-methoxyacridine in 31 parts of phenol was heated at 60° C. and a solution of 5.0 parts of 4.4'-diamino-diphenylether in 41 parts of phenol was stirred in slowly. The mixture was then heated 1.5 hours at 100° C., and the resulting material treated with aqueous alkali and worked up as in Example 1. There was obtained 11 parts of a dark yellow powder melting over the range 145° to 153° C. and being probably 4.4'-di-(6-chloro-2-methoxy-9-acridylamino)-diphenylether.

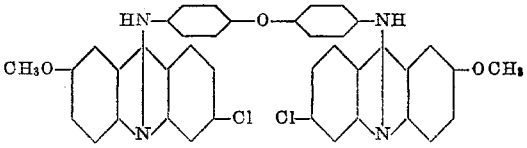

The compound contained 10.0 per cent chlorine and 8.38 per cent nitrogen, as compared to theoretical values of 10.37 per cent and 8.2 per cent for

$C_{40}H_{28}O_3N_4Cl_2$

What is claimed is:

1. As new products, diacridyl-diamines corresponding to the general formula:

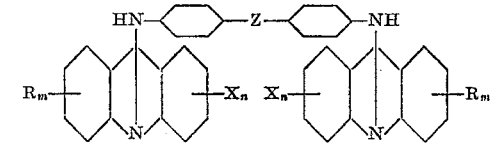

wherein R is lower alkoxy, X is halogen, Z is a radical of the class consisting of methylene, hydroxymethylene, and oxygen, and $m$ and $n$ each is an integer from 0 to 2.

2. As a new product, 4.4'-di-(6-chloro-2-methoxy-9-acridylamino)-diphenylmethane, a yellow powder having a melting point of about 214.5° to 215.5° C.

3. As a new product 4.4'-di-(6-chloro-2-methoxy-9-acridylamino)-diphenylether, a dark yellow powder having a melting point of about 145° to 153° C.

EDGAR C. BRITTON.
GERALD H. COLEMAN.

REFERENCES CITED

The following references are of record in the file of this patent:

UNITED STATES PATENTS

| Number | Name | Date |
|---|---|---|
| 2,083,908 | Hata et al. | June 15, 1937 |

OTHER REFERENCES

Burckhalter et al.: J. A. C. S. 65, 2012–2015 (Oct. 1943).

Wiselogle: "Survey of Antimalarial Drugs, 1941–1945" (J. W. Edwards, Ann Arbor, Mich., 1946), vol. II, page 1376.